United States Patent [19]
Ployd

[11] Patent Number: 5,261,259
[45] Date of Patent: Nov. 16, 1993

[54] VIDEO CASSETTE SECURITY APPARATUS

[76] Inventor: Craig R. Ployd, P.O. Box 432, Telford, Pa. 18969

[21] Appl. No.: 935,403

[22] Filed: Aug. 26, 1992

[51] Int. Cl.⁵ .............................................. E05B 73/00
[52] U.S. Cl. ........................................ 70/58; 70/167; 292/DIG. 38; 360/132; 360/137; 411/50
[58] Field of Search ............ 70/57, 57.1, 58, 166–169; 292/43, DIG. 38; 360/132, 137; 411/49, 51, 53, 50

[56] References Cited

U.S. PATENT DOCUMENTS

| | | | |
|---|---|---|---|
| 2,810,401 | 10/1957 | Stansbury | 292/55 X |
| 3,130,571 | 4/1964 | Neumann | 70/58 |
| 3,747,541 | 7/1973 | Reese | 70/167 X |
| 3,785,670 | 1/1974 | Smith | 411/403 X |
| 4,035,921 | 7/1977 | Williams | 70/167 X |
| 4,100,777 | 7/1978 | Fredon | 70/491 |
| 4,628,713 | 12/1986 | Cecchi et al. | 70/58 |
| 4,693,389 | 9/1987 | Kalen | 411/55 X |
| 4,716,745 | 1/1988 | Hehn | 70/58 |
| 4,763,784 | 8/1988 | Newell | 360/132 X |

FOREIGN PATENT DOCUMENTS

| | | | |
|---|---|---|---|
| 0028988 | 2/1987 | Japan | 360/132 |
| 0557828 | 12/1943 | United Kingdom | 411/553 |

Primary Examiner—Lloyd A. Gall
Attorney, Agent, or Firm—Joseph W. Molasky & Associates

[57] ABSTRACT

A locking device for use with a video cassette tape to prevent unauthorized usage in view of its content. The device incorporates a member that is expandable into certain recesses of the cassette when placed into a locking mode and, is not expanded when the cassette is in a non-locking mode. A specialized key is utilized with the device to prevent its duplication.

14 Claims, 3 Drawing Sheets

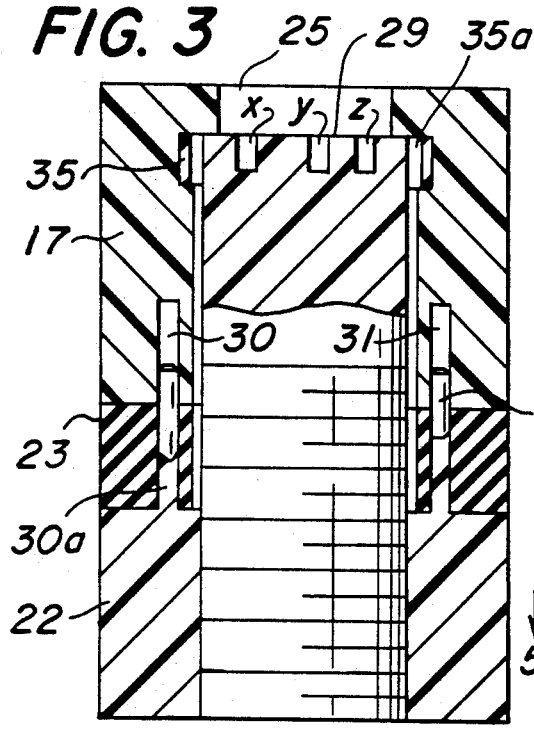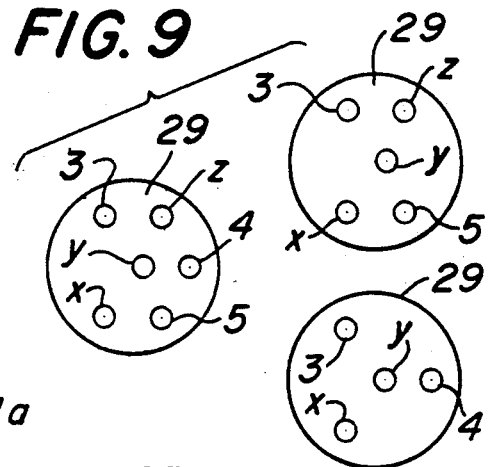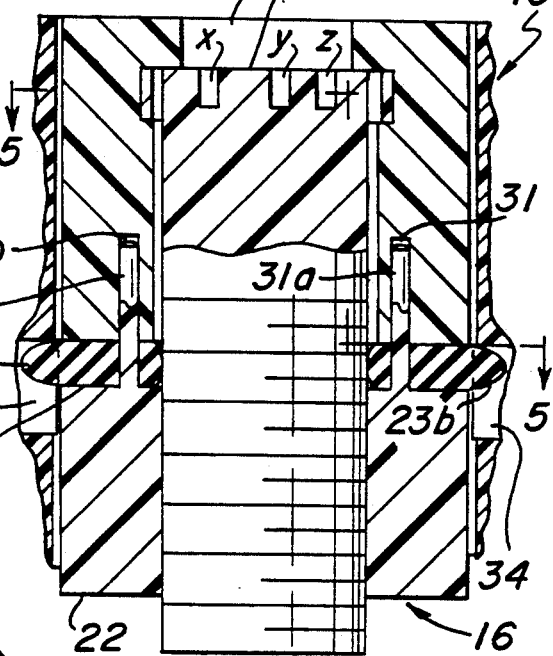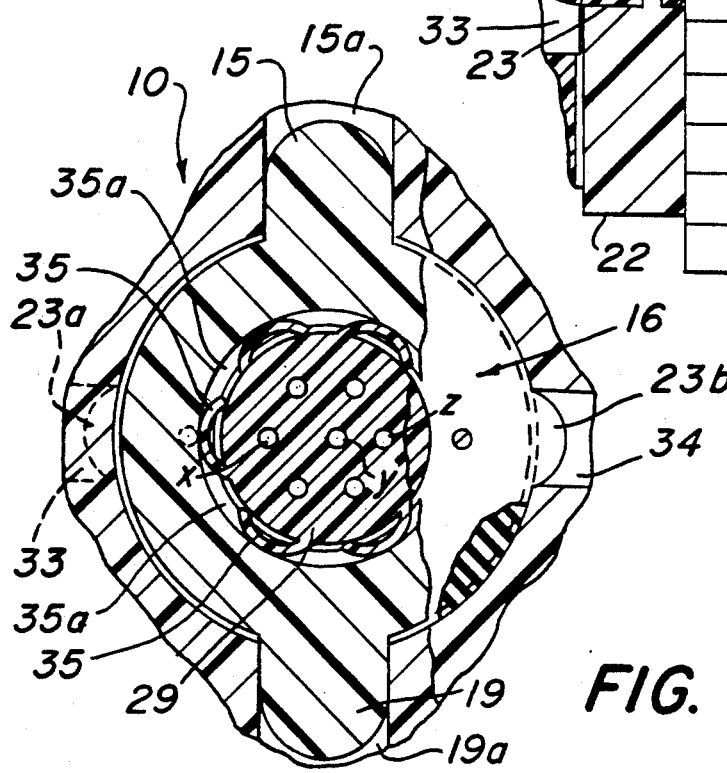

VIDEO CASSETTE SECURITY APPARATUS

BACKGROUND OF THE INVENTION

The present invention relates in general to security locking devices and, in particular, to such devices for use in video cassette tapes whose viewing of is restricted.

Security apparatus used with prerecorded tape or tape having certain restricted information for use in video cassettes has become useful in modern day society. This results from a need, for example, to prevent unauthorized viewing of the contents of a cassette that may contain X-rated movie scenes that should not be viewed by non-adults.

Present day security systems for video cassettes are disclosed in certain prior art patents such as patents U.S. Pat. No. 4,716,745 (Hehn) and U.S. Pat. No. 4,628,713 (Cecchi). Both of these patents disclose relatively complex locking structures in operation and construction. In the Hehn patent, a key having barbs positioned at its lower end is employed with a lock mechanism which is inserted into the bore of the cassette. A pair of tabs are utilized to engage recesses in the bore of the cassette when the lock mechanism is placed in the security mode; and, in the non-security position the barbs are employed to retract the tabs from the pair of recesses.

The Cecchi patent discloses a video cassette locking operation which requires a pair of tongs designed to lock into two side openings of the cassette to secure it's operation; in addition, a special key is used to move the tongs inwardly to allow removal of the lock from the cassette.

Both of the above prior patents are somewhat complicated and expensive to secure the relatively inexpensive video cassette and, therefore, they do not appear to be viable in today's marketplace and, hence, do not provide an adequate solution to the security problem under discussion.

SUMMARY OF THE INVENTION

The security device for VCR usage and herein disclosed is essentially comprised of an expandable intermediate section which is designed to fit into recesses located in a bore of the cassette. Once the expandable section is positioned into the bore opening by turning of a key, the cassette becomes inoperable since it cannot be inserted into a VCR.

The expandable section is located between two outer members which are able to be drawn together by a turning of a threaded bolt via the key. The two outer members are maintained in alignment with one another by pins which are also utilized to prevent either member from turning.

When the security device is ready for removal from the cassette, it is placed in the unlocked position by a turning of the key such that the intermediate member is no longer in an expanded state and it returns to its normal contour. This enables the security locking device to be easily pulled out of the bore in a manner to allow viewing of the content of the cassette.

BRIEF DESCRIPTION OF THE DRAWINGS

FIG. 3 is a sectional view of the lock assembly which includes an expandable intermediate unit positioned between two outer units and brought together by a turning of a key operated bolt.

FIG. 4 is another sectional view illustrating the expanded intermediate unit when the assembly places the cassette in the locked position.

FIG. 5 is a sectional view of FIG. 4 taken along the line 5—5 and depicting the hole pattern for receiving a multiple prong key.

DESCRIPTION OF THE PREFERRED EMBODIMENT

Figure 1:
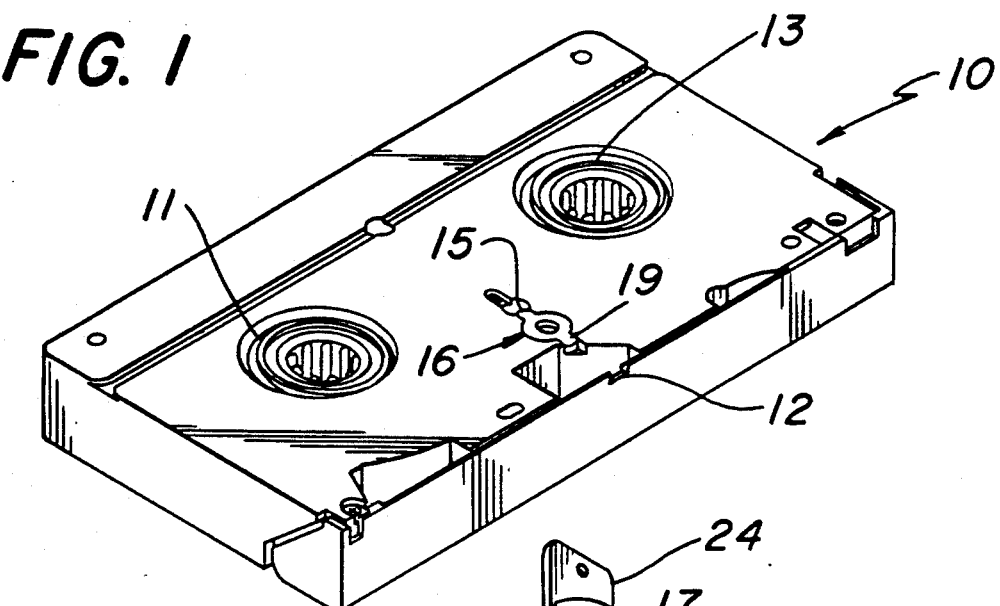
FIG. 1 is a front elevational view of a video cassette with lock inserted into the bore.

Referring to the drawings and in particular to FIG. 1 there is depicted a video cassette 10 for the use with a video cassette recorder (not shown) which is referred to generally as a VCR. The cassette 10 is provided with an internal recording medium or tape which is capable of recording signals representative of picture frames as presented on a television screen. The tape is internally located upon supply and take up reels 11,13 which may be positioned upon spindles for rotation with the VCR. The cassette 10 is provided with an alignment channel which includes a bore 14 (see FIG. 2) in which side openings 33,34 (see FIG. 4) are located; in addition, a slot 12 is provided to assist in properly locating the cassette when placed in the VCR.

The alignment channel of which the slot 12 is part is depicted in a blocked condition since the cassette 10 is made inoperative through the locking mechanism 16 which is located in the bore 14. The mechanism 16 is locked into the alignment channel and bore 14 via extensions 23a, 23b (see FIG. 4) which penetrate side openings 33,34.

Figure 2:
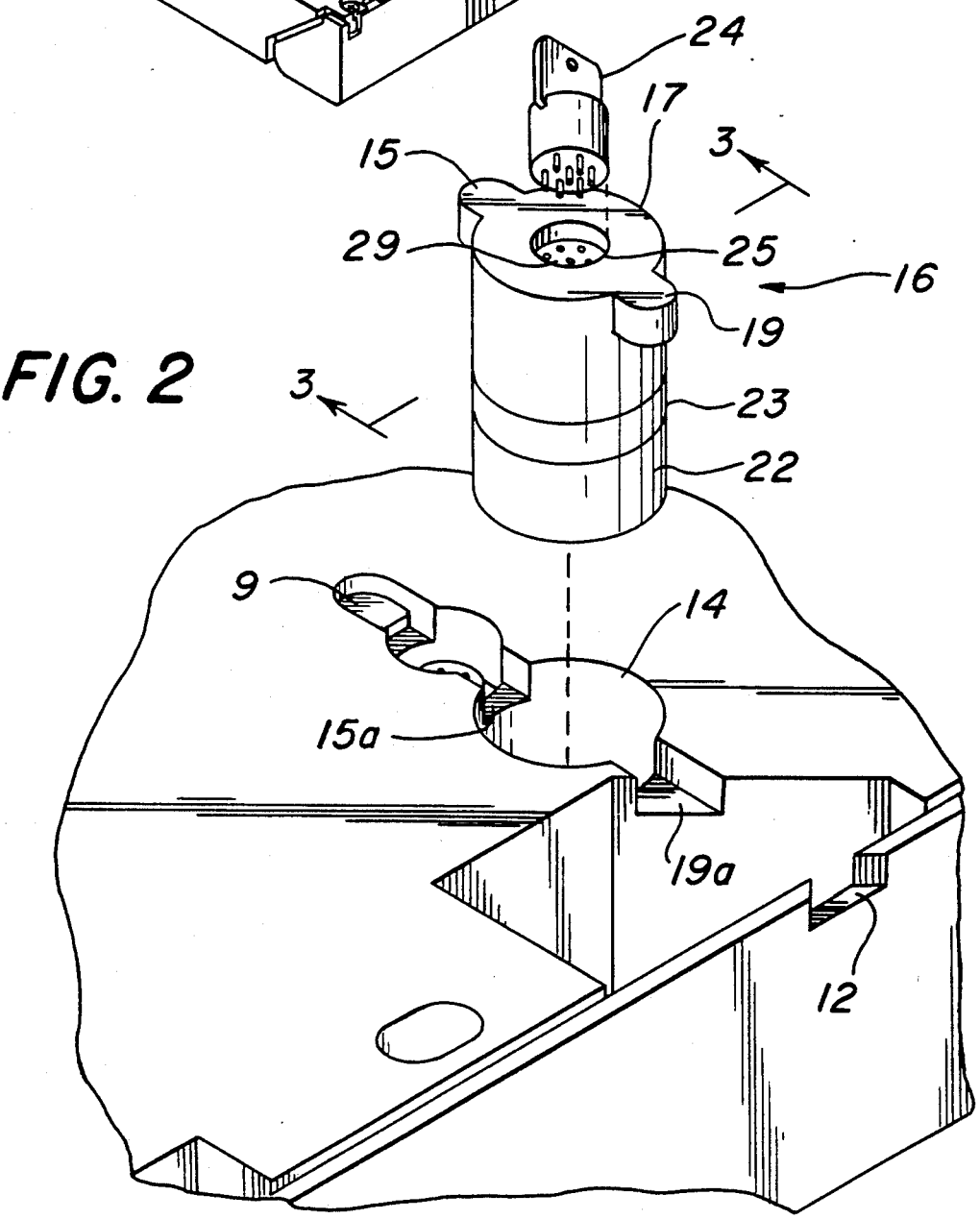
FIG. 2 is an exploded view of a portion of the cassette in which the locking mechanism is positioned for entrance into the bore of the video cassette alignment channel.

Reference is made to FIG. 2 where the locking mechanism 16 is more clearly illustrated with respect to the bore 14. The lock 16 comprises a three-piece unit consisting of an upper and lower plastic or synthetic section 17,22 and an intermediate compressible rubber section 23. The upper section 17 includes the two extensions 15,19 which are integrally attached and are located opposite one another for placement in the alignment channel such that extension 15 lays upon shelf 15a and extension 19 upon shelf 19a. A well opening 25 is located in the top member 17 for insertion of a multi-prong key 24 that is utilized to turn a threaded bolt 29. This operation will be discussed in greater detail hereinafter.

FIG. 3, which is a sectional view of the locking mechanism 16 of FIG. 2, illustrates the relationship of the three members 17,22,23 and further depicts that the bottom member 22 provides an internal thread for mating with the bolt 29. No thread is furnished with the upper and intermediate members 17,23. Alignment pins 30a,31a are attached to the lower member 22 and are designed to enter into openings 30, 31 provided in the upper member 17 and in the intermediate member 23. A plurality of semi-circular elements 35 are formed along the top of the thread 29 in order to provide a frictional surface against a channel 35a; accordingly, this frictional contact between elements 35 and surface 35a prevents facile turning of the bolt 29 by unauthorized users with a key. The top of the bolt 29 includes cylindrical female receptacles x,y,z for receiving certain of the male pins emanating from the key 24 (see FIG. 2). The plan drawing of FIG. 5 furnishes a view of the various pin positions with respect to the top of the bolt 29 wherein a seven prong arrangement can be associated into many different combinations consisting of seven or less than seven pins. Hence, key 24 cannot be readily duplicated and the security of the cassette cannot be easily breached.

FIG. 4 represents the mechanism 16 in the bore 14 (see FIG. 2) in a locking position such that the cassette 10 cannot operate. To produce the locking mode for the mechanism 16, the multi-prong key 24 is inserted into mating female openings x,y,z located upon the upper surface of bolt 29. After the key 24 is properly inserted into the bolt 29, it is rotated in a clockwise direction as viewed in FIG. 5 thereby causing lower member 22 to move upwardly. The male pins 30a, 31a simultaneously move upwardly into the female openings 30, 31 in order to keep the lower member 22 in alignment with upper member 17. By bringing members 17 and 22 together the intermediate member 23, which is made of 90 durometer rubber, is compressed causing protrusion 23a, 23b to extend into respective openings 33,34 located within bore 14 (see FIG. 2) of the cassette 10. This operation may be reviewed with greater clarity in the plan view of FIG. 5.

Figure 6:
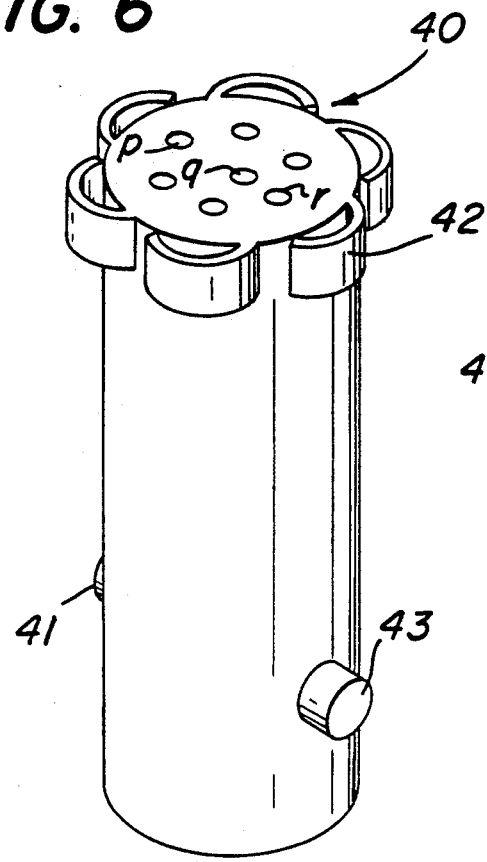
FIG. 6 is another embodiment of a cassette locking device wherein a cylindrical member is utilized with protruding dual pins for use with a cam slot.
Figure 7:
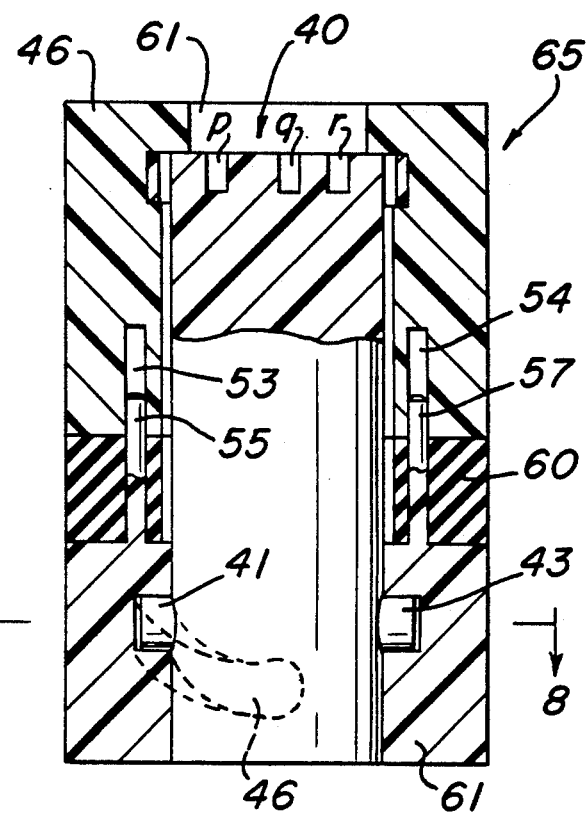
FIG. 7 is as sectional view of FIG. 6 depicting the cam slot operated cassette lock.
Figure 8:
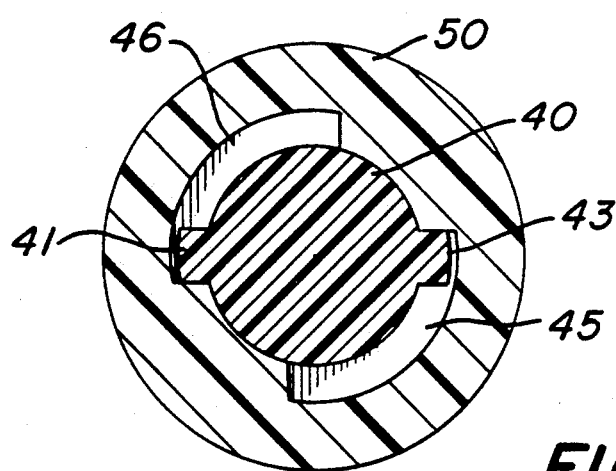
FIG. 8 is a sectional view of FIG. 7 taken along the line 8—8 which illustrates the dual pins in relationship to the respective slots.

FIG. 6 represents another embodiment of the invention where a cylindrical member 40 is depicted for positioning in the multi-member locking mechanisms 65 of FIG. 7. The cylindrical member 40 includes diametrically opposed pins 41, 43 which are located below the middle of the cylinder's length dimension and the top surface includes female openings p,q,r, for example, for receiving a male pronged key as described above with respect to FIG. 2. Semi-circular elements 42 ar also utilized as frictional contacts in the manner previously described. In all other respects the operation of the locking mechanism 65 is similar in scope to the embodiment of FIGS. 1 to 5. When the cylinder 40 is fully assembled into the locking mechanism 65 of FIG. 7 the multi-prong key 24 is inserted into the well opening 61 for mating with the female openings p,q,r located upon the top surface of cylinder 40. A clockwise rotation as viewed in the plan view of FIG. 8, therefore, will cause the pin 41 to follow the cam track 46. The CAM track 46 as viewed in FIG. 7 is a curved spiral slot which is formed in the side of lower member 61. A second slot 45 is similarly formed and is oppositely positioned to slot 46 as may be clearly viewed in FIG. 8.

In operation, the clockwise movement of the pins 41, 43 in the respective CAM tracks 46, 45 causes the lower member 61 to rise directly upward as determined by the pins 55, 57 within mated openings 53, 54.

In the manner previously described the upward movement of member 61 squeezes the intermediate member 60 to develop extensions (not shown) which enter openings located in the bore of the alignment channel. As understood from the previous discussion this squeezing action locks the mechanism 65 into the alignment channel of the VCR cassette so that it becomes secured by being made inoperative.

Referring now to FIG. 9 there is illustrated certain combinational patterns for the key 24 resulting from the seven hole pattern of FIG. 5. The various combinations of holes for matching the key 24 is determined by using six, five or four holes at a time and the combinations depicted are for one combination of the particular group that is used. The combinational versatility of the key prongs insure the unlikelihood that a key associated with one locking mechanism will be duplicated by the purchase of another locking mechanism.

In summary, a multi-piece mechanism utilizes a three-piece structure in which a threaded bolt or cylinder carrying pins for use with a spirally designed CAM slot is employed. The rotation of the threaded bolt or the pins carried on a cylinder and connected to a CAM slot are designed to compress a rubberized intermediate section which produces a locking action upon the cassette.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. An apparatus for complete insertion within a bore of a video cassette to prevent usage and wherein diametrically opposed alignment channels are located on an upper surface of said cassette, the improvement comprising:
    a.) a tumblerless locking mechanism for internally locating in said bore wherein said mechanism essentially comprises upper, intermediate and lower tubular means, and said intermediate means being compressible;
    b.) said upper, intermediate, and lower means having substantially equal diameters, and being coupled to one another in a manner to allow for deforming said intermediate means by compression;
    c.) means attached to said upper means and adapted to fit into said alignment channels in either of two directions;
    d.) a tread means formed in an opening of said lower tubular means;
    e.) a threaded member located through said upper and intermediate means and mating with said tread means, such that when said member is rotated said upper and lower means are drawn to one another to cause said intermediate means to be deformed and extend beyond said equal tubular diameters, and
    f.) whereby said completely inserted apparatus enables said video cassette to be placed in the lock position to prevent its operation.

2. An apparatus in accordance with claim 1 and further including,
    alignment pins integrally located upon said lower means for coupling with openings provided in said intermediate and upper means.

3. An apparatus in accordance with claim 2 wherein said compressible intermediate means includes a memory for allowing it to return to its original state after said locked position is terminated.

4. An apparatus in accordance with claim 3 wherein said compressible means is rubber with a durometer of ninety.

5. An apparatus in accordance with claim 1 and further including,
    side openings formed in said bore wherein said intermediate means may be compressed and extended beyond the diameters of said tubular means and into said side openings.

6. An apparatus in accordance with claim 1 and further including,
    a hole pattern formed into a top surface of said threaded member.

7. An apparatus in accordance with claim 6 and further including,
    a multi-prong male key means for mating with certain holes of said hole pattern to allow a facile turning of said threaded member,
    whereby said mechanism may be placed in a locked or unlocked state.

8. An apparatus in accordance with claim 1 and further including,
    channel means formed in said upper tubular means wherein said channel means is in a facing relationship with said bore.

9. An apparatus for total insertion within a bore of a video cassette to prevent usage and wherein diametrically opposed alignment channels are located on an upper surface of said cassette, the improvement comprising:
    a.) a tumblerless locking mechanism for internally locating in said bore wherein said mechanism essentially comprises upper, intermediate, and lower tubular means, and said intermediate mans being compressible,
    b.) said upper, intermediate and lower means having substantially equal diameters and being coupled to one another in a manner to allow for deforming said intermediate means by compression;
    c.) a cylindrical member for locating through said tubular means;
    d.) at least one projection extending from said cylindrical member;
    e.) a cam track for receiving said projection formed in said lower tubular means;
    f.) means attached to said upper means and adapted to fit into said alignment channels in either of two directions;
    g.) means located on said cylindrical member to facilitate its rotation for causing said intermediate means to compress and expand beyond said diameter;
    h.) whereby said totally inserted apparatus enables said video cassette to be placed in a locked position to prevent its operation.

10. An apparatus in accordance with claim 9 and further including a second projection extending from said cylindrical member and located oppositely from said first projection.

11. An apparatus in accordance with claim 10 and further including a second cam track for receiving said second projection.

12. An apparatus in accordance with claim 9 and further including,
    means peripherally located around said cylindrical member for locating in a channel to provide frictional contact.

13. An apparatus in accordance with claim 9 and further including,
    channel means formed in said upper tubular means wherein said channel means is in a facing relationship with said bore.

14. An apparatus in accordance with claim 13 and further including,
    means peripherally located around said cylindrical member for locating in said channel means to provide frictional contact.

* * * * *